United States Patent
Szuba

[11] Patent Number: 5,980,208
[45] Date of Patent: Nov. 9, 1999

[54] TORQUE CONVERTER HUB SLEEVE CONVERTIBLE TO VARIOUS DRIVE CONNECTIONS

[75] Inventor: Joseph A. Szuba, Dearborn, Mich.

[73] Assignee: Ford Global Technologies, Inc., Dearborn, Mich.

[21] Appl. No.: 08/995,273

[22] Filed: Dec. 19, 1997

[51] Int. Cl.⁶ ........................................................ F01D 5/12
[52] U.S. Cl. ........................... 416/197 C; 416/244 R; 464/182; 60/330
[58] Field of Search ........................... 416/197 C, 244 R, 416/180; 415/216.1; 464/88, 182, 183; 60/330, 358, 339

[56] References Cited

U.S. PATENT DOCUMENTS

| | | |
|---|---|---|
| 3,577,628 | 5/1971 | Bunyan . |
| 3,981,068 | 9/1976 | Ivey et al. ................. 416/180 |
| 4,059,365 | 11/1977 | Ivey et al. ................. 416/180 |
| 4,212,187 | 7/1980 | Scholz . |
| 4,527,978 | 7/1985 | Zackrisson ................. 464/182 |
| 4,974,715 | 12/1990 | Koyama ..................... 192/3.3 |
| 5,601,494 | 2/1997 | Duggan ..................... 464/182 |
| 5,603,448 | 2/1997 | Woerner et al. . |

Primary Examiner—F. Daniel Lopez
Assistant Examiner—Richard Woo
Attorney, Agent, or Firm—Frank G. McKenzie

[57] ABSTRACT

A sleeve having a wear resistant surface is fitted over and secured to the outer surface of a hub for a bladed torque converter wheel. The sleeve may be secured by mechanical interference, bonding, or welding. The sleeve is adapted for use in transmissions for front-wheel drive and rear-wheel drive vehicles and is suitably formed for engagement with various drive connections.

10 Claims, 2 Drawing Sheets

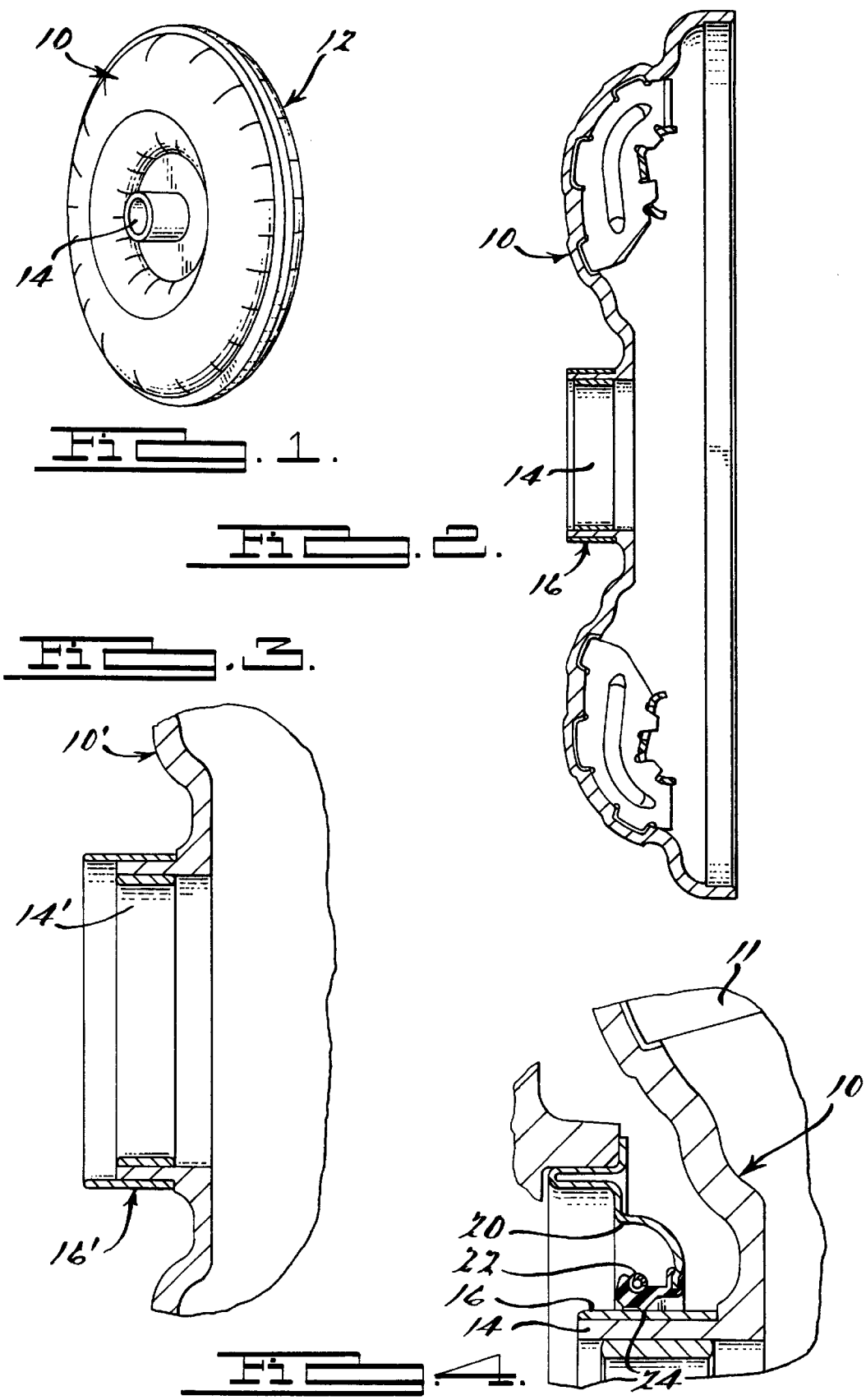

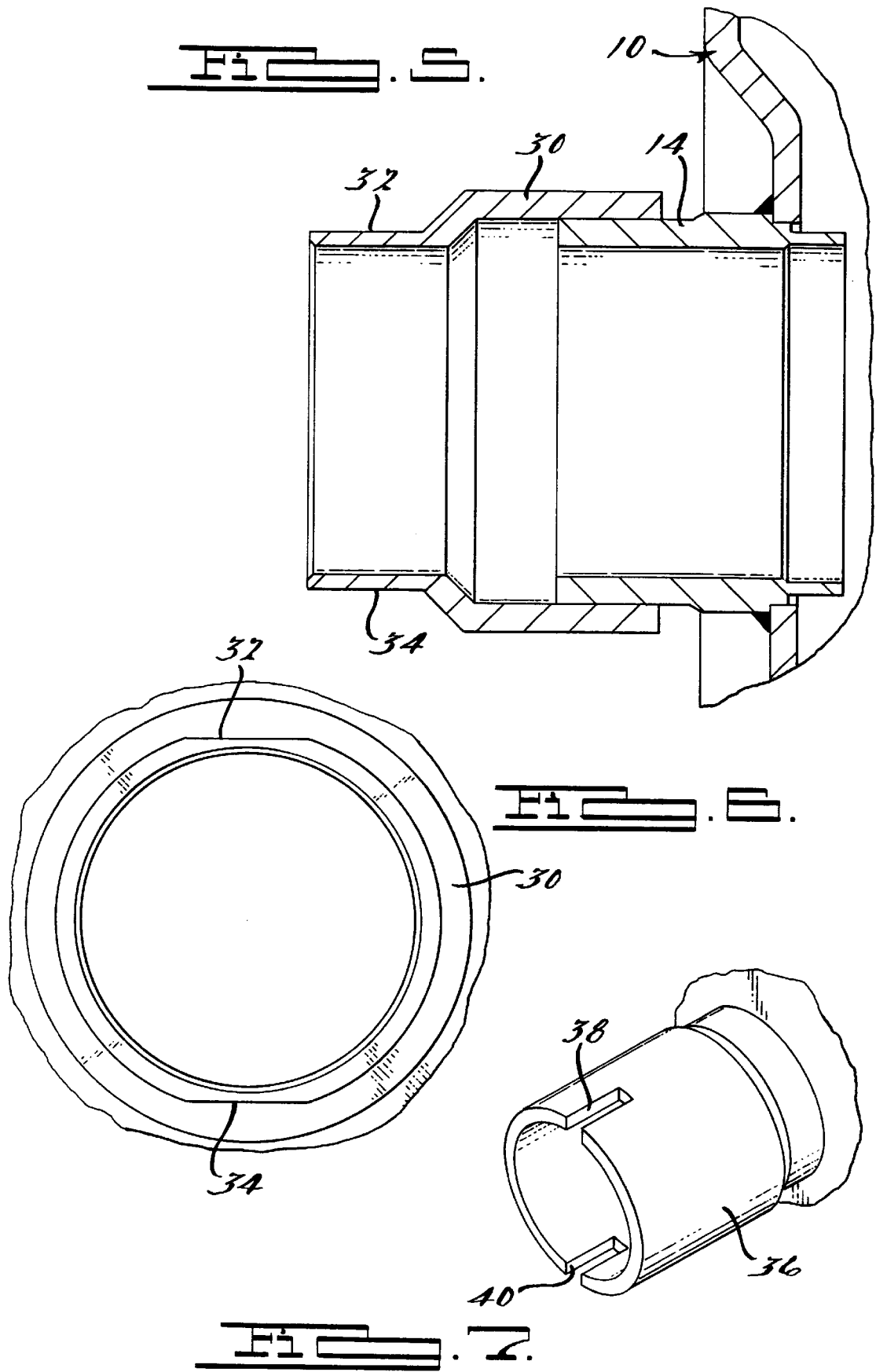

TORQUE CONVERTER HUB SLEEVE CONVERTIBLE TO VARIOUS DRIVE CONNECTIONS

BACKGROUND OF THE INVENTION

1. Field of the Invention

This invention relates to the field of torque converters for automatic transmissions. More particularly, the instant invention pertains to a sleeve placed over the hub of a bladed torque converter wheel, such as an impeller, stator or turbine wheel.

2. Description of the Related Art

Automatic transmissions of the type employed in motor vehicles, commonly employ a mechanical gear train and a hydrokinetic torque converter located on the input side of the transmission gear train. The torque converter includes several rotating wheels fitted with radially extending vanes or blades, one of which is the driving wheel or impeller, another is the driven wheel or turbine. When assembled, the impeller and turbine define a toroidal cavity or chamber wherein hydraulic oil exiting the engine-driven impeller drives the turbine and the mechanical gear train driveably connected to the turbine.

Various repair and replacement methods are known. One method currently practiced includes removing the hub that is integral with an impeller cover hub by heating a weld between the housing and hub, and welding a new hub to the housing. In another method, the welded joint between the hub and impeller cover is simply cut away and a new hub is welded to the assembly. As a practical matter, the concentricity of the outer surface of the hub must be corrected after a new hub is installed using these methods.

Another method used to recondition a worn torque converter hub is disclosed by Scholz in U.S. Pat. No. 4,212,187. Scholz teaches the use of an tool to expand diametrically a worn impeller hub. The hub is expanded to a diameter greater than its original condition, then ground and finished to the original diameter.

Unfortunately, Scholz's expansion and grinding of the original hub decreases the final material thickness and weakens the hub. Furthermore because the hub still consists of the original material, hub wear due, for example, to preloaded seal contact with the rotating hub, will continue and the problem will recur.

It is desirable to provide a torque converter wheel that can readily be reconfigured for use both for front wheel drive and rear wheel drive vehicles or for any other purpose that requires variable structural attachments or drive connections.

SUMMARY OF THE INVENTION

Torque converters for use in front-wheel drive vehicles transmit torque from the impeller hub through a shaft or other component to the rotor of a hydraulic fluid pump located adjacent the impeller case. Torque converters for rear-wheel drive vehicles typically transmit torque from the impeller hub directly to the pump rotor.

Preferably a torque converter for a front-wheel drive application could be used also for a rear-wheel drive application by modifying the form of the impeller hub so that it drives the pump rotor directly or a shaft connected to the pump rotor. It has been necessary either to replace the entire impeller assembly with a new one, or to remove the tubular hub portion of the assembly and replace it with a new hub. Use of the present invention permits this modification to be readily implemented, with little complexity, reliably, and at low cost. In this way, a torque converter can be taken from one transmission and installed in a test fixture or another transmission. According to this invention, a single impeller design can be used interchangeably in transmissions for forward drive or rear drive vehicles.

Responsive to the disadvantages of the prior art, the present invention provides an efficient, inexpensive, effective technique for modifying the hub of a torque converter housing for these purposes.

According to various embodiments of the instant invention, the sleeve is secured to the hub by mechanical interference, adhesive bonding, brazing or welding.

A still further embodiment of the instant invention provides for a portion of the hub to be removed and a sleeve having a wear resistant surface to be fitted over the remaining portion of the outer surface of the hub.

These and other desired objects of the instant invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 1 is a perspective view of a torque converter.

FIG. 2 is an enlarged vertical section of a bladed wheel of the torque converter shown in FIG. 1.

FIG. 3 is an alternate embodiment of the present invention.

FIG. 4 is a partial cross section in the vicinity of the hub of a bladed wheel of a torque converter.

FIG. 5 is a cross section of a portion of a torque converter wheel in the vicinity of its hub.

FIG. 6 is an end view of the hub of FIG. 5.

FIG. 7 is an end view of an alternative form of the hub of FIG. 5.

DETAILED DESCRIPTION OF THE PREFERRED EMBODIMENTS

The invention will be described next with reference to the drawings, which illustrate the invention. Referring to FIG. 1, there is shown a typical torque converter including an impeller assembly 10 and a turbine assembly 12, which cooperatively form a toroidal cavity. Blades 11 are fixed to the inner surface of the impeller 10 cover, and similar blades are fixed to the inner surface of the turbine 12 cover.

Preferably the blades are formed with tabs located in slots formed in the cover or case, the blades being distributed mutually spaced around the inner surface of the case. After locating the blades in this way, the blade tabs are rolled over so that each tab is closely adjacent the surface of the case, and the blades are held in position by bending the tabs in the slots while the assembly is moved from place-to-place during assembly. Then a copper-based brazing paste is spread over the areas where the tabs are located in the slots of the case. The assembly is place in a brazing furnace and the temperature of the assembly is raised to braze the blades to the case. Unfortunately this brazing operation softens the case in relation to its hardness condition before brazing.

The impeller cover is driveably connected to an engine. In order to support rotatably the impeller and to prevent leakage of hydraulic fluid contained in the toroidal cavity, the exterior surfaces of the hub 14 are precisely dimensioned and finished to have a precision fit within a sealed bearing, not shown.

Referring now to FIG. 4, a hydraulic seal 20, located on the outer side of the impeller cover 10 is urged radially inward toward the outer surface of a sleeve 16 by a circular garter spring 22. The inner surface of the seal presents a localized line of contact 24 immediately below the spring that maintains preloaded contact with the sleeve as the hub and sleeve rotate relative to the seal. The hardened surface of the sleeve prevents the seal from wearing a circular groove in the sleeve. However, if the seal contacts the relatively soft surface of the hub 14, the preloaded seal can wear a groove into the hub surface. That groove compromises the seal integrity and permits leakage past the seal.

If the sleeve were absent, after extended service, the outer surface of the hub 14 may become scored or worn to a reduced size, or both. This wear adversely affects the integrity of the hydraulic seal on the hub and requires that the condition be corrected.

As shown in FIG. 2, preferably a sleeve is installed after removing material from the outer surface of the hub 10 to produce a smaller outer diameter or size than that of the outer surface of the hub as originally produced. The material can be removed by turning and machining or grinding, or by other techniques. The diameter of the hub 14 after finishing is related to the size of the inner diameter of the sleeve 16 and whether an interference mechanical fit or shrink fit is used. The outer surface of the hub may be knurled after material removal to facilitate fixing the sleeve to the hub. Alternately sleeve 16 may be fixed or secured to the hub by adhesive bonding, brazing or welding, in which methods the dimension of the hub outer surface or diameter after material removal is somewhat less critical.

A sleeve 16 is formed, preferably of a wear resistant material such as hardened steel in the form of a hollow right circular cylinder. An example of a preferred wear resistant material is 1018 structural steel tubing having a minimum hardness of Rb 90. The sleeve outer diameter is determined by the original unworn hub diameter. The insertion end of the hub or sleeve may be beveled or chamfered for ease of installation. The sleeve 16 is then fitted to the hub 10 after material removal as described above. If an interference fit or shrink fit is used, the sleeve may be forced over the hub outer surface by pressing or some other acceptable method compatible with the magnitude of interference between the hub 10 and sleeve 16.

In an alternate embodiment of the present invention, FIG. 3 shows an axial end portion of the original hub removed. This eliminates a majority of the damaged surface and allows for less material removal by grinding or machining. Further the sleeve 16' must only be pressed over a shorter hub 10' length.

The form of the impeller hub 14 can be changed in accordance with the need for various drive connections. For example, when the torque converter is used in a front-wheel drive application, the hub may require a splined connection to a shaft that drives a hydraulic pump. In a rear-wheel drive configuration the hub may require a direct drive connection to a pump, examples of which are shown in FIGS. 5–7. A sleeve 30 having diametrically opposed flat surfaces 32, 34 located at an axial end of the sleeve is fitted over the surface of hub 14 and fixed to the hub against displacement or rotation relative to the hub. The flats 32, 34 are adapted to driveably engage the rotor of a pump, such as a Gerotor hydraulic pump. FIG. 7 shows a sleeve 36 formed with diametrically opposite axial directed slots 38, 40 adapted to engage and drive a pump rotor. The sleeve may also be formed with a spline adapted to engage a complement spline on a shaft driveably connected to a pump rotor for use in a front-wheel drive transmission.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

I claim:

1. A wheel for a torque converter comprising:

a case forming a portion of a toroidal cavity about an axis of rotation;

a hub having an outer surface extending from the case and directed substantially parallel to the axis, and an axial end facing away from the case;

a sleeve having an inner surface and outer surface, the inner surface of the sleeve fitted over the outer surface of the hub, the sleeve being fixed to the outer surface of the hub against displacement relative thereto, extending axially beyond the axial end of the hub and having means adapted to driveably engage either a pump rotor or another component.

2. The wheel of claim 1 wherein the sleeve is a right circular hollow cylindrical sleeve, the inner surface having an inner diameter, the outer surface having an outer diameter, the inner diameter being sized to fit over the outer surface of the hub.

3. The wheel of claim 1, wherein said hub and said sleeve are fixed together by a mechanical interference fit therebetween.

4. The wheel of claim 2, wherein said hub and said sleeve are fixed together by adhesive bonding material located between the outer surface of the hub and inner surface of the sleeve.

5. The wheel of claim 1, wherein said hub and said sleeve are fixed together by welding.

6. The wheel of claim 1, wherein said hub and said sleeve are fixed together by brazing.

7. A wheel for a torque converter comprising:

a case forming a portion of a toroidal cavity about an axis of rotation;

a hub having an outer surface extending from the case and directed substantially parallel to the axis, and an axial end facing away from the case;

a sleeve having an inner surface and outer surface, the inner surface of the sleeve fitted over the outer surface of the hub, the material of the outer surface of the sleeve being harder than the material of the outer surface of the hub, the sleeve being fixed to the outer surface of the hub against displacement relative thereto, extending axially beyond the axial end of the hub and having means adapted to driveably engage either a pump rotor or another component.

8. The wheel of claim 7, wherein the sleeve is a right circular hollow cylindrical sleeve, the inner surface having an inner diameter, the outer surface having an outer diameter, the inner diameter being sized to fit over the outer surface of the hub, the sleeve including diametrically opposed slots directed axially and located at an axial end of the sleeve.

9. The wheel of claim 7, wherein the sleeve is a right circular hollow cylindrical sleeve, the inner surface having an inner diameter, the outer surface having an outer diameter, the inner diameter being sized to fit over the outer surface of the hub, the sleeve including diametrically opposed planar surfaces, each said surface extending along the axis and across a chord of the circular cylinder and located at an axial end of the sleeve.

10. The wheel of claim 7, wherein said hub and said sleeve are fixed together by at least one member of the group consisting of adhesive bonding, brazing, welding, and mechanical interference between the hub and sleeve.

\* \* \* \* \*